E. J. CONDLEY.
FISHING ROD.
APPLICATION FILED OCT. 18, 1921.
1,409,282.
Patented Mar. 14, 1922.
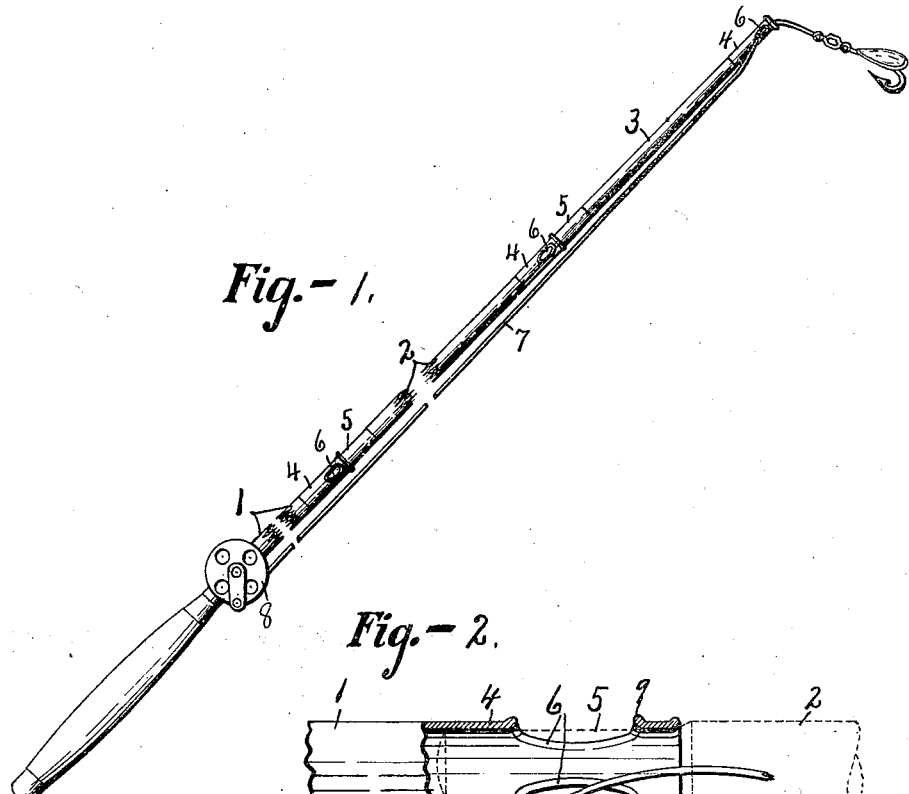
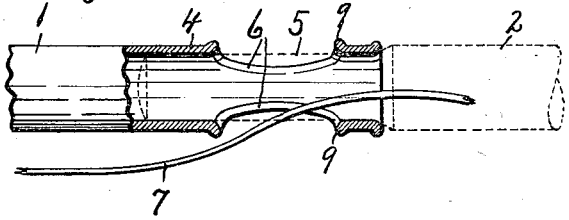
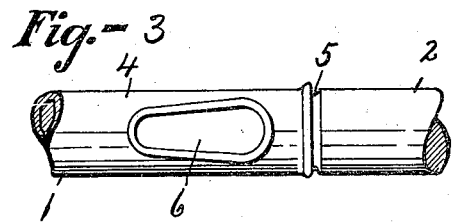
Inventor
E. J. Condley
By Howard P. Denison
Attorney

UNITED STATES PATENT OFFICE.

EDWARD J. CONDLEY, OF AUBURN, NEW YORK.

FISHING ROD.

1,409,282.   Specification of Letters Patent.   Patented Mar. 14, 1922.

Application filed October 18, 1921. Serial No. 508,545.

*To all whom it may concern:*

Be it known that I, EDWARD J. CONDLEY, of Auburn, in the county of Cayuga, in the State of New York, have invented new and useful Improvements in Fishing Rods, of which the following, taken in connection with the accompanying drawings, is a full, clear, and exact description.

This invention relates to a sectional fishing rod in which the several sections progressively diminish in diameter from the handle to the extreme tip section and are connected end to end and coaxially by telescopic joints.

The main object is to provide the joint socket of each section for receiving the ferrule of the adjacent section with one or more eyes communicating with the opening in the end of the socket through which the line may be threaded so that the line may be used with one or more rod sections as a complete unit according to the use or kind of fishing to which it may be put.

Other objects and uses relating to specific parts of the rod may be brought out in the following description:

In the drawings:

Fig. 1 is a side elevation partly broken away of a series of, in this instance three, sections of a fishing rod embodying the various features of my invention.

Fig. 2 is an enlarged longitudinal vertical sectional view of the socket and of one of the sections showing the line as threaded through one of the eyes communicating with the socket and open end thereof, the dotted lines indicating the ferrule end of an adjacent rod section in operative position in the socket.

Fig. 3 is a side elevation of the adjacent ends of two of the sections joined together by telescopic connection and showing the eye in the socketed end of one of the sections.

In order that my invention may be clearly understood, I have shown a handle section —1— and two additional rod sections —2— and —3— progressively diminishing in diameter on the other section toward the tip of the section most remote from the handle, the smaller end of each section being provided with a socketed member —4— for receiving telescopically the ferrule end —5— of the next adjacent section, the socket and ferrule being correspondingly tapered to fit tightly one within the other when assembled.

Each socketed member is provided with one or more, in this instance two, diametrically opposite and longitudinally elongated eyes —6—, either of which is adapted to receive a fishing line —7— when the next adjacent section is removed or withdrawn from the socketed member to permit the use of one or more of the rod sections as may be required or desired for different kinds of fishing, under which conditions, the line running along the outer side of the greater portion of the length of the socketed section is diverted through one of the eyes —6— and thence outwardly through the open end of the socket and is adapted to carry one or more fish-hooks at the protruding end for use in still fishing, casting and other kinds of fishing.

Any suitable reel —8— may be attached to the handle section —1— for controlling the length of a free line extending beyond the rod. The marginal walls of each of the eyes —6— is preferably rounded outwardly at —9— to allow the line to be taken up or apart across said walls without excessive friction or chafing of the line.

It will be observed that the sockets of each section extend some distance beyond the opposite ends of the eyes —6— which afford firm bearings for each of the nipples —5— at both ends of said eyes, thus maintaining a stiff telescopic joint or connection between adjacent sections and at the same time providing the terminal socket of each section with a pair of eyes through either of which the line may be threaded to permit the use of the handle section or one or more additional sections as may be required or any one of the sections may be used independently of the others with full provision for the threading of the line of the eye at the tip thereof.

What I claim is:

1. A fishing rod comprising a handle section having a socketed end provided with an eye through one side of the socket between the ends thereof to permit a fish line to be threaded therethrough and through the outer open end of the socket, an additional rod section having a nipple at one end telescopically fitted within the end of the handle section and having its other end provided with a socket of relatively smaller diameter than that of the first named socket, the smaller socket having an opening through one side thereof between the ends of the socket for the reception of a fish line, which may be threaded therethrough and through the outer open end of the smaller socket.

2. A fishing rod composed of sections progressively diminishing in diameter from the handle section toward the extreme tip section, the outer end of each section being provided with a socket and lateral eyes through the walls thereof, each socket extending some distance beyond opposite ends of the adjacent eye, the inner ends of the rod sections other than the handle section being provided with nipples telescopically fitted within the adjacent socket and when assembled extending beyond the inner ends of the eyes to effectively close the same, said eyes permitting the threading of the fish line therethrough when the sections are detached one from the other.

In witness whereof I have hereunto set my hand this 8th day of October, 1921.

EDWARD J. CONDLEY.

Witnesses:
   FRED H. WIGGINS,
   CHARLES H. MANRO.